US012671138B2

(12) United States Patent
Jo et al.

(10) Patent No.: US 12,671,138 B2
(45) Date of Patent: Jun. 30, 2026

(54) BATTERY, AND BATTERY PACK AND VEHICLE INCLUDING THE SAME

(71) Applicant: LG ENERGY SOLUTION, LTD., Seoul (KR)

(72) Inventors: Min-Ki Jo, Daejeon (KR); Bo-Hyun Kang, Daejeon (KR); Do-Gyun Kim, Daejeon (KR); Geon-Woo Min, Daejeon (KR); Su-Ji Choi, Daejeon (KR); Kwang-Su Hwangbo, Daejeon (KR); Jae-Woong Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 219 days.

(21) Appl. No.: 18/277,848

(22) PCT Filed: Feb. 18, 2022

(86) PCT No.: PCT/KR2022/002467
§ 371 (c)(1),
(2) Date: Aug. 18, 2023

(87) PCT Pub. No.: WO2022/177376
PCT Pub. Date: Aug. 25, 2022

(65) Prior Publication Data
US 2024/0136650 A1 Apr. 25, 2024
US 2024/0234931 A9 Jul. 11, 2024

(30) Foreign Application Priority Data

Feb. 19, 2021 (KR) ........................ 10-2021-0022877
Feb. 19, 2021 (KR) ........................ 10-2021-0022894
(Continued)

(51) Int. Cl.
*H01M 50/342* (2021.01)
*H01M 10/04* (2006.01)
(Continued)

(52) U.S. Cl.
CPC ... *H01M 50/3425* (2021.01); *H01M 10/0431* (2013.01); *H01M 50/107* (2021.01);
(Continued)

(58) Field of Classification Search
CPC ........... H01M 50/3425; H01M 50/107; H01M 50/507; H01M 50/213; H01M 50/583;
(Continued)

(56) References Cited

U.S. PATENT DOCUMENTS 4,965,144 A * 10/1990 Ng .................... H01M 50/3425
429/55
5,665,483 A 9/1997 Saito et al.
(Continued)

FOREIGN PATENT DOCUMENTS

CN 1713437 A 12/2005
CN 101694881 A 4/2010
(Continued)

OTHER PUBLICATIONS

Encyclopedia of Metals, Maruzen Co., Ltd., 1999, p. 479 (6 pages total), with English translation.
(Continued)

*Primary Examiner* — Niki Bakhtiari
*Assistant Examiner* — Omar M Kekia
(74) *Attorney, Agent, or Firm* — Birch, Stewart, Kolasch & Birch, LLP

(57) ABSTRACT

A battery includes an electrode assembly defining a core and an outer circumference by winding a first electrode, a second electrode, and a separator interposed therebetween around a winding center, each of the first electrode and the second electrode includes a first uncoated portion and a second uncoated portion on which an active material layer is not coated along the winding direction; a battery housing accommodating the electrode assembly through an opening
(Continued)

formed on one side thereof; a cap including a venting portion, covering the opening, and electrically connected to the battery housing and the first uncoated portion; and a battery terminal penetrating one surface of the battery housing and electrically connected to the second uncoated portion.

32 Claims, 9 Drawing Sheets

(30) Foreign Application Priority Data

| | | |
|---|---|---|
| Feb. 23, 2021 | (KR) | 10-2021-0024424 |
| Oct. 1, 2021 | (KR) | 10-2021-0131215 |
| Nov. 10, 2021 | (KR) | 10-2021-0154307 |

(51) Int. Cl.

| | |
|---|---|
| *H01M 50/107* | (2021.01) |
| *H01M 50/167* | (2021.01) |
| *H01M 50/213* | (2021.01) |
| *H01M 50/249* | (2021.01) |
| *H01M 50/507* | (2021.01) |
| *H01M 50/559* | (2021.01) |
| *H01M 50/583* | (2021.01) |

(52) U.S. Cl.
CPC ....... *H01M 50/213* (2021.01); *H01M 50/507* (2021.01); *H01M 50/583* (2021.01); *H01M 50/167* (2021.01); *H01M 50/249* (2021.01); *H01M 50/559* (2021.01); *H01M 2220/20* (2013.01)

(58) Field of Classification Search
CPC ............. H01M 50/249; H01M 50/559; H01M 50/167; H01M 10/0431; H01M 2220/20
USPC .......................................................... 429/53
See application file for complete search history.

(56) References Cited

U.S. PATENT DOCUMENTS

| | | | |
|---|---|---|---|
| 6,399,237 B1 † | 6/2002 | Souliac | |
| 7,955,736 B2 † | 6/2011 | Cheon | |
| 2001/0049054 A1 | 12/2001 | Enomoto et al. | |
| 2005/0181272 A1 | 8/2005 | Kim | |
| 2005/0287428 A1 | 12/2005 | Cheon et al. | |
| 2006/0063063 A1 | 3/2006 | Mori et al. | |
| 2006/0257729 A1 * | 11/2006 | Lee | H01M 50/103 |
| | | | 429/61 |
| 2008/0182159 A1 | 7/2008 | Mitani et al. | |
| 2010/0151317 A1 | 6/2010 | Kim et al. | |
| 2010/0255358 A1 † | 10/2010 | Yoneyama | |
| 2011/0086252 A1 | 4/2011 | Phillips | |
| 2011/0212348 A1 * | 9/2011 | Yasui | H01M 50/227 |
| | | | 429/7 |
| 2011/0256433 A1 | 10/2011 | Fuhr et al. | |
| 2012/0100406 A1 | 4/2012 | Gaugler | |
| 2013/0273401 A1 | 10/2013 | Lee et al. | |
| 2014/0234676 A1 | 8/2014 | Tyler et al. | |
| 2015/0111082 A1 | 4/2015 | Sumpf et al. | |
| 2015/0243960 A1 | 8/2015 | Imanishi et al. | |
| 2017/0062789 A1 | 3/2017 | Sim et al. | |
| 2017/0256769 A1 | 9/2017 | Wynn et al. | |
| 2017/0338463 A1 | 11/2017 | Sugaya et al. | |
| 2019/0081294 A1 † | 3/2019 | Capati | |
| 2020/0044226 A1 * | 2/2020 | Fukuoka | H01M 50/107 |
| 2020/0044289 A1 | 2/2020 | Pasma et al. | |
| 2021/0074978 A1 * | 3/2021 | Chun | H01M 10/0525 |
| 2021/0075051 A1 | 3/2021 | Zhou | |
| 2021/0184308 A1 | 6/2021 | Kim et al. | |
| 2021/0280835 A1 | 9/2021 | Peng et al. | |
| 2022/0200108 A1 | 6/2022 | Kim | |

FOREIGN PATENT DOCUMENTS

| | | | |
|---|---|---|---|
| CN | 201766130 U | | 3/2011 |
| CN | 201781028 U | † | 3/2011 |
| CN | 102217116 A | | 10/2011 |
| CN | 204596910 U | | 8/2015 |
| CN | 107112597 A | | 8/2017 |
| CN | 104488113 B | | 10/2017 |
| CN | 104247082 B | | 2/2018 |
| CN | 110459705 A | | 11/2019 |
| CN | 209912959 U | | 1/2020 |
| CN | 111446386 A | | 7/2020 |
| CN | 111834557 A | | 10/2020 |
| CN | 212182379 U | † | 12/2020 |
| EP | 2 876 338 A1 | | 5/2015 |
| JP | 7-201309 A | | 8/1995 |
| JP | 8-102313 A | | 4/1996 |
| JP | 10-214609 A | | 8/1998 |
| JP | 2955135 B2 | | 10/1999 |
| JP | 2000-260417 A | | 9/2000 |
| JP | 2001-52759 A | | 2/2001 |
| JP | 2002-216716 A | | 8/2002 |
| JP | 2004-14173 A | | 1/2004 |
| JP | 2004-95487 A | | 3/2004 |
| JP | 2005-216737 A | | 8/2005 |
| JP | 3718872 B2 | | 11/2005 |
| JP | 2006-120606 A | | 5/2006 |
| JP | 2008-192552 A | | 8/2008 |
| JP | 2009-211952 A | | 9/2009 |
| JP | 4346637 B2 | | 10/2009 |
| JP | 4401634 B2 † | | 1/2010 |
| JP | 2015106613 | † | 6/2015 |
| JP | 2016-91711 A | | 5/2016 |
| JP | 2016-195036 A | | 11/2016 |
| JP | 2016-225014 A | | 12/2016 |
| JP | 2016-537799 A | | 12/2016 |
| JP | 2019-153388 A | | 9/2019 |
| KR | 10-0551885 B1 | | 2/2006 |
| KR | 10-2014-0082270 A | | 7/2014 |
| KR | 10-2015-0134566 A | | 12/2015 |
| KR | 10-2016-0121106 A | | 10/2016 |
| KR | 10-2017-0025074 A | | 3/2017 |
| KR | 10-2017-0069003 A | | 6/2017 |
| KR | 10-2018-0129115 A | | 12/2018 |
| KR | 1020180129 | † | 12/2018 |
| KR | 10-2019-0041294 A | | 4/2019 |
| KR | 10-2019-0084740 A | | 7/2019 |
| KR | 10-2019-0097231 A | | 8/2019 |
| KR | 10-2020-0067897 A | | 6/2020 |
| KR | 10-2021-0012636 A | | 2/2021 |
| WO | WO 2010/146154 A2 | | 12/2010 |
| WO | WO202011088 | † | 6/2020 |
| WO | 2020/235916 A1 | | 11/2020 |

OTHER PUBLICATIONS

International Search Report (PCT/ISA/210) issued in PCT/KR2022/002467 mailed on Jun. 17, 2022.
European Communication pursuant to Rule 114(2) EPC for European Application No. 22756574.4, dated May 3, 2024.
Decision to Grant a Patent issued in Japanese Patent Application No. 2023-536881 dated Dec. 26, 2024.
Notice of Reasons for Refusal issued in Japanese Patent Application No. 2023-536881 dated Jun. 7, 2024.
Extended European Search Report for European Application No. 22756574.4, dated Jun. 5, 2025.

\* cited by examiner
† cited by third party

FIG. 2

BATTERY, AND BATTERY PACK AND VEHICLE INCLUDING THE SAME

TECHNICAL FIELD

The present disclosure relates to a battery, and a battery pack and a vehicle including the same. More specifically, the present disclosure relates to a battery having a structure in which a cap covering an opening on one side of a battery housing may function as a venting device and as a current interruption device (CID) at the same time, and a battery pack and a vehicle including the same.

The present application claims priority to Korean Patent Application No. 10-2021-0022877 filed on Feb. 19, 2021, Korean Patent Application No. 10-2021-0022894 filed on Feb. 19, 2021, Korean Patent Application No. 10-2021-0024424 filed on Feb. 23, 2021, Korean Patent Application No. 10-2021-0131215 filed on Oct. 1, 2021, and Korean Patent Application No. 10-2021-0154307 filed on Nov. 10, 2021 in the Republic of Korea, the disclosures of which are incorporated herein by reference.

BACKGROUND ART

In general, when manufacturing a battery pack using a cylindrical battery, a plurality of cylindrical batteries are usually disposed upright inside a housing, and the plurality of cylindrical batteries are electrically connected to each other by using an upper end and a lower end of the cylindrical battery as a positive electrode terminal and a negative electrode terminal, respectively.

This is because, in a cylindrical battery, an uncoated portion of a negative electrode of an electrode assembly accommodated in the battery housing extends downward to be electrically connected to a bottom surface of the battery housing, and an uncoated portion of a positive electrode extends upward to be electrically connected to a cap. That is, in the cylindrical battery, it is common that the bottom surface of the battery housing is used as a negative electrode terminal, and the cap covering a top opening of the battery housing is used as a positive electrode terminal.

However, when the positive electrode terminal and the negative electrode terminal of the cylindrical battery are located at opposite sides, an electrical connection component such as a busbar for electrically connecting the plurality of cylindrical batteries should be applied to both the upper and lower portions of the cylindrical battery. Thus, the electrical connection structure of the battery pack is complicated.

In addition, in this structure, since a component for insulation and a component for ensuring waterproofness should be individually applied to the upper and lower portions of the battery pack, the number of applied components is increased and the structure is complicated.

Therefore, in order to simplify the electrical connection structure of the plurality of cylindrical batteries, there is a need for developing a cylindrical battery having a structure in which a positive electrode terminal and a negative electrode terminal are applied in the same direction. Moreover, in the cylindrical battery having such a structure, in one direction where the positive electrode terminal and the negative electrode terminal are formed, several components may be concentrated to form the positive electrode terminal and the negative electrode terminal. Thus, a structure for venting due to an increase in internal pressure and a structure for blocking a current when an overcurrent occurs need to be formed on the opposite side to the direction in which the positive electrode terminal and the negative electrode terminal are formed.

DISCLOSURE

Technical Problem

The present disclosure is designed to solve the problems of the related art, and therefore the present disclosure is directed to allowing a cap covering an opening of a battery housing to function as a venting device and as a current interruption device (CID) at the same time.

In addition, the present disclosure is directed to enabling to simplify an electrical connection structure of a plurality of batteries.

Also, the present disclosure is directed to allowing a coupling area between a component for electrical connection and a battery to be sufficiently ensured in electrically connecting a plurality of batteries.

However, technical problems to be solved by the present disclosure are not limited to the above-described problems, and other problems not mentioned herein may be clearly understood by one of ordinary skill in the art from the following description of the present disclosure.

Technical Solution

In one aspect of the present disclosure, there is provided a battery including: an electrode assembly comprising a first electrode, a second electrode, and a separator between the first electrode and the second electrode, the first electrode, the second electrode, and the separator being wound in a winding direction to define a core and an outer circumference of the electrode assembly, wherein the first electrode and the second electrode include a first uncoated portion and a second uncoated portion on which an active material layer is not coated along the winding direction, respectively; a battery housing accommodating the electrode assembly therein, the battery housing having an opening at a first side of the battery housing; a cap including a venting portion having a thinner thickness compared to a peripheral region of the cap, the cap covering the opening, and the cap being electrically connected to the battery housing and the first uncoated portion; and a battery terminal electrically connected to the second uncoated portion.

The battery housing may be electrically connected to the first uncoated portion through the cap.

The cap may include a connection portion electrically connected to the first uncoated portion.

The venting portion may be a closed loop, and the connection portion may be encircled by the closed loop.

The venting portion may have a groove shape on at least one of an outer surface of the cap and an inner surface of the cap.

The battery terminal may be exposed outside of the battery housing through a partially closed portion of the battery housing located at a second side opposite the opening.

The battery terminal may extend through a central portion of the partially closed portion.

The battery terminal may be electrically insulated from the battery housing.

The battery may further include a first current collector coupled to the first uncoated portion.

The first current collector may be electrically connected to the cap.

The battery may further include a lead tab electrically connecting the first current collector and the cap.

The lead tab may have a length longer than a distance between the first current collector and the cap.

The battery may further include a second current collector coupled to the second uncoated portion.

The second current collector may be electrically connected to the battery terminal.

The battery may further include a sealing gasket located between the cap and the battery housing.

The battery housing may include a beading portion adjacent the first end; and a crimping portion bent inward to provide an end defining the opening, the end of the crimping portion overlapping an edge of the cap below the beading portion.

The sealing gasket may be located between the crimping portion and the cap in a region other than a contact region between the cap and the battery housing.

An edge of the first current collector may be supported by the beading portion.

An insulating layer may be located between the edge of the first current collector and the beading portion of the battery housing.

The insulating layer may be an insulating coating layer located on a surface of any one of the first current collector or the beading portion.

The battery may further include an insulator that covers a lower surface of the electrode assembly facing the cap.

The insulator may include a hole formed at a position corresponding to the core of the electrode assembly.

The battery may include a lead tab electrically connecting the first current collector and the cap, and the insulator may include a hole through which the lead tab passes.

At least a portion of the first uncoated portion may include a plurality of segment pieces divided along the winding direction of the electrode assembly, and the plurality of segment pieces may be bent along a radial direction of the electrode assembly.

The plurality of bent segment pieces may be overlapped in multiple layers along the radial direction.

The electrode assembly may include a welding target region in which a number of overlapping segment pieces of the first uncoated portion remains constant along the radial direction of the electrode assembly, and the first current collector may be coupled to the first uncoated portion in the welding target region.

At least a portion of the second uncoated portion may include a plurality of segment pieces divided long the winding direction of the electrode assembly, and the plurality of segment pieces may be bent along a radial direction of the electrode assembly.

The plurality of bent segment pieces may be overlapped in multiple layers along the radial direction.

The electrode assembly may include a welding target region in which a number of overlapping segment pieces of the second uncoated portion remains constant along the radial direction of the electrode assembly, and the second current collector may be coupled to the second uncoated portion in the welding target region.

A resistance measured between the first electrode and the second electrode may be 4 milliohm or less.

A ratio obtained by dividing a diameter of the battery by a height of the battery can may be greater than 0.4.

Meanwhile, in another aspect of the present disclosure, there is provided a battery pack including a plurality of batteries according to the present disclosure as described above.

The plurality of batteries may be arranged in a predetermined number of columns, and the battery terminal and an outer surface of the partially closed portion of the battery housing of each battery may be disposed to face upward.

The battery pack may include a plurality of busbars connecting the plurality of batteries in series and in parallel, wherein the plurality of busbars may be disposed on top of the plurality of batteries. In this case, each of the busbars may include a body portion extending between battery terminals of adjacent batteries of the plurality of batteries; a plurality of first busbar terminals extending from a first side of the body portion, the plurality of first busbar terminals electrically coupled to the battery terminals of the batteries arranged on the first side; and a plurality of second busbar terminals extending from a second side of the body portion opposite the first side, the plurality of second bus bars being electrically coupled to the outer surfaces of the partially closed portions of the battery housings of the batteries arranged on the second side.

In another aspect of the present disclosure, there is provided a vehicle including a battery pack according to the present disclosure as described above.

Advantageous Effects

According to the present disclosure, the cap covering the opening of the battery housing may function as a venting device and as a current interruption device (CID) at the same time.

In addition, according to the present disclosure, it is possible for a plurality of batteries to be electrically connected at one side in the longitudinal direction of the batteries, and thus the electrical connection structure may be simplified.

Also, according to the present disclosure, a coupling area between a component for electrical connection and a battery may be sufficiently ensured, thereby reducing electric resistance and sufficiently ensuring coupling strength.

However, effects to be obtained by the present disclosure are not limited to the above-described effects, and other effects not mentioned herein may be clearly understood by one of ordinary skill in the art from the following description of the present disclosure.

DESCRIPTION OF DRAWINGS

The accompanying drawings illustrate a preferred embodiment of the present disclosure and together with the foregoing disclosure, serve to provide further understanding of the technical features of the present disclosure, and thus the present disclosure is not construed as being limited to the drawing.

FIG. 2 is a cross-sectional view illustrating an internal structure of a cylindrical battery according to an embodiment of the present disclosure.

BEST MODE

Figure 1:
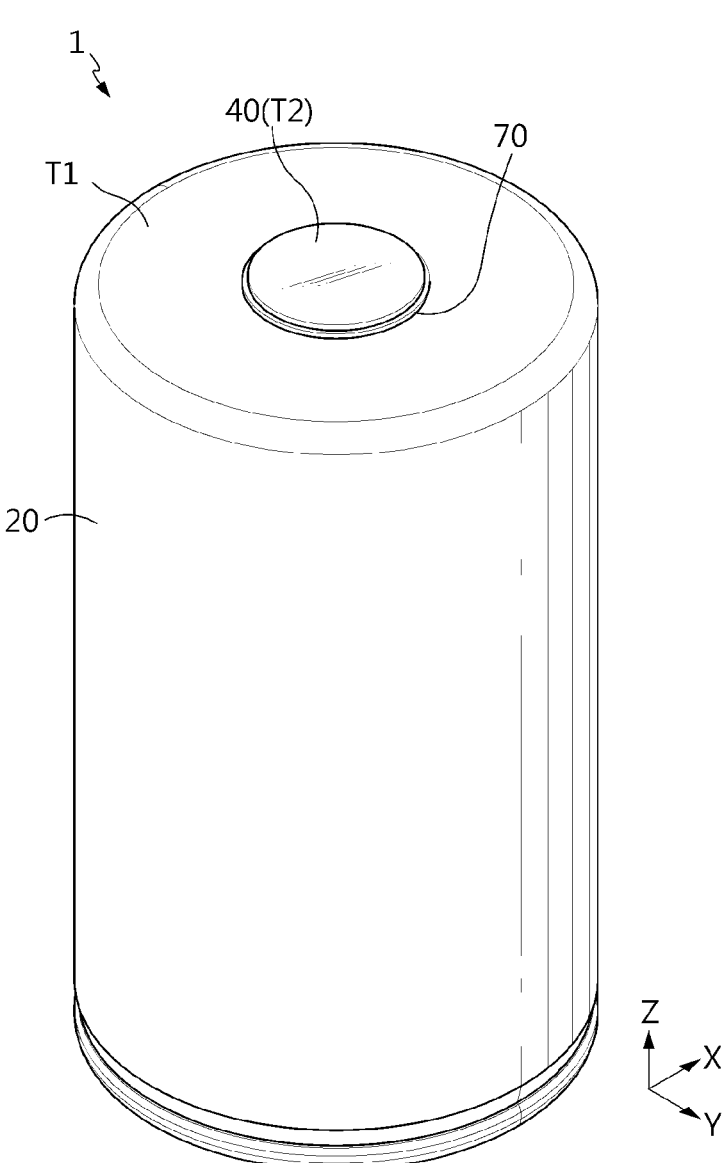
FIG. 1 is a view illustrating an appearance of a cylindrical battery according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In addition, in order to help understanding of the present disclosure, the accompanying drawings are not drawn to scale, but dimensions of some components may be exaggerated. Also, the same reference number may be assigned to the same component in different embodiments.

A statement that two objects of comparison are identical means 'substantially identical'. Therefore, 'substantially identical' may include deviations considered to be low in the art, for example, deviations within 5%. Also, uniformity of a certain parameter in a predetermined region may mean that it is uniform in terms of an average.

Although the first, second, and the like are used to describe various components, these components are not limited by these terms, of course. These terms are used only to distinguish one component from another component, and unless otherwise stated, it goes without saying that the first component may be the second component.

As used herein, unless otherwise stated, each component may be singular or plural.

Placing any component on the "upper (or lower)" of a component or "top (or below)" of a component may mean that any component is disposed in contact with the top (or bottom) surface of the component, and also may mean that other components may be interposed between the component and any component disposed on (or under) the component.

Also, when it is described that a component is "linked", "coupled", or "connected" to another component, the components may be directly linked or connected to each other, but it should be understood that still another component may be "interposed" between each component, or each component may be "linked", "coupled", or "connected" through still another component.

As used herein, the expression "A and/or B" means "A, B or both of them", unless expressly stated to the contrary, and the expression "C to D" means "C or more and D or less", unless expressly stated to the contrary.

Referring to FIGS. 1 to 3C and FIG. 6, a battery 1 according to an embodiment of the present disclosure may be, for example, a cylindrical battery. The cylindrical battery 1 includes an electrode assembly 10, a battery housing 20, a cap 30, and a battery terminal 40. The cylindrical battery 1 may further include a first current collector 50 and/or a sealing gasket 60 and/or an insulating gasket 70 and/or a second current collector 80 and/or an insulator (a first insulator) 90, in addition to the above-described components. The present disclosure is not limited by the type of the battery, and may be applied to a battery of other types, for example, a prismatic battery.

The electrode assembly 10 includes a first uncoated portion 11 and a second uncoated portion 12. The electrode assembly 10 includes a first electrode having a first polarity, a second electrode having a second polarity, and a separator interposed between the first electrode and the second electrode. The first electrode is a negative electrode or a positive electrode, and the second electrode corresponds to an electrode having a polarity opposite to that of the first electrode.

The electrode assembly 10 may have, for example, a jelly-roll shape. That is, the electrode assembly 10 may be manufactured by winding a stack formed by sequentially stacking the first electrode, the separator, and the second electrode at least once. The jelly-roll type electrode assembly 10 may include a winding center hole formed in the winding center C and extending along the height direction (direction parallel to the Z-axis). Meanwhile, an additional separator may be provided on the outer circumference of the electrode assembly 10 for insulation from the housing 20.

The first electrode includes a first conductive substrate and a first electrode active material layer formed by being coated on one or both surfaces of the first conductive substrate. A first electrode uncoated portion to which the first electrode active material is not applied is present at one end of the first conductive substrate in a width direction (direction parallel to the Z-axis). The first electrode uncoated portion has a shape extending from one end to the other end along the longitudinal direction of the first electrode when viewed with the first electrode unfolded. The first electrode uncoated portion 11 may function as a first electrode tab. The first uncoated portion 11 is provided on one surface of the electrode assembly 10. More specifically, the first uncoated portion 11 is provided at the bottom of the electrode assembly 10 accommodated in the housing 20 in the height direction (direction parallel to the Z-axis).

The second electrode includes a second conductive substrate and a second electrode active material layer formed by being coated on one or both surfaces of the second conductive substrate. A second electrode uncoated portion to which the second electrode active material is not applied is present at the other end of the second conductive substrate in a width direction (direction parallel to the Z-axis). The second electrode uncoated portion has a shape extending from one end to the other end along the longitudinal direction of the second electrode when viewed with the second electrode unfolded. The second electrode uncoated portion 12 may function as a second electrode tab. The second uncoated portion 12 is provided on the other surface of the electrode assembly 10. More specifically, the second uncoated portion 12 is provided on top of the electrode assembly 10 accommodated in the housing 20 in the height direction (direction parallel to the Z-axis).

That is, the first uncoated portion 11 and the second uncoated portion 12 extend and protrude in the height direction (direction parallel to the Z-axis) of the electrode assembly 10, that is, in opposite directions along the height direction of the cylindrical battery 1, and are exposed to the outside of the separator.

Figure 7:
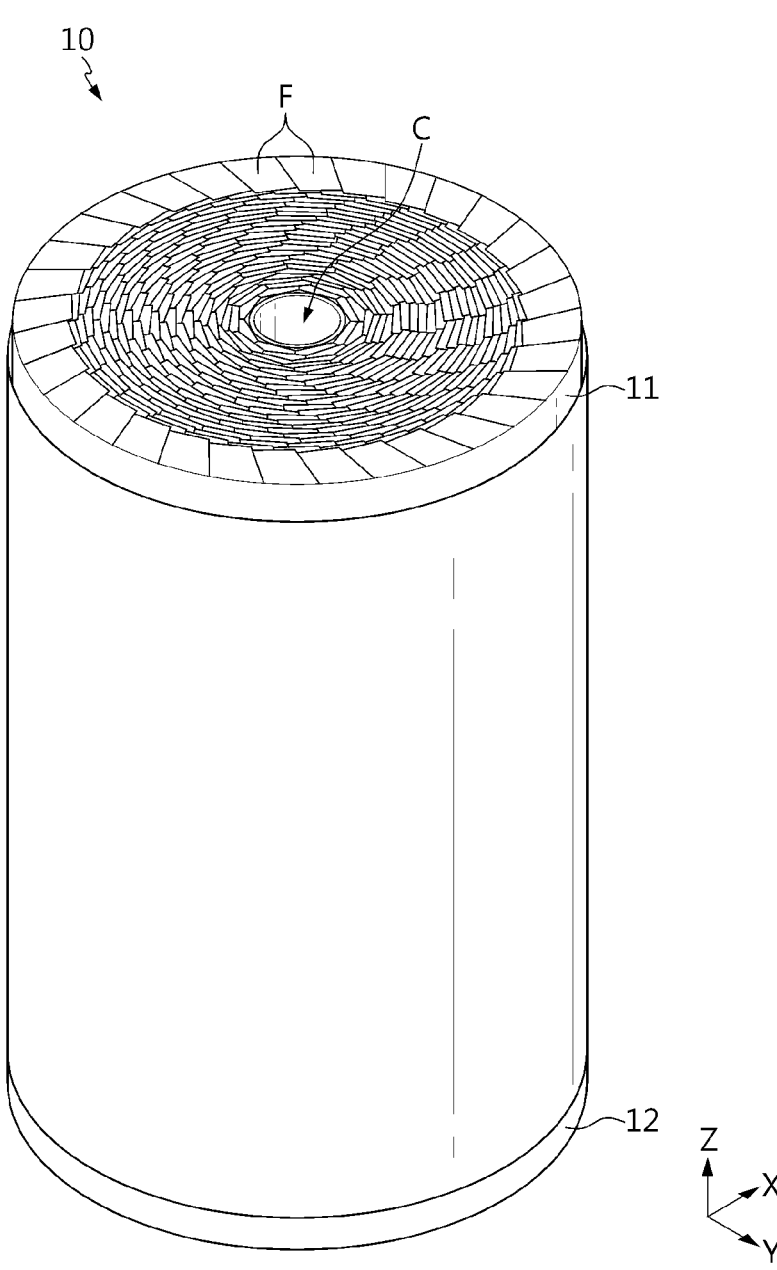
FIG. 7 is a view illustrating an electrode assembly in which segment pieces are formed.

Meanwhile, referring to FIG. 7, at least a portion of the first uncoated portion 11 and/or the second uncoated portion 12 may include a plurality of segment pieces F divided along a winding direction of the electrode assembly 10. In this case, the plurality of segment pieces may be bent along a radial direction of the electrode assembly 10. The plurality of bent segment pieces may be overlapped in multiple layers. In this case, the first current collector 50 and/or the second current collector 80 to be described later may be coupled to a region in which the plurality of segment pieces F are overlapped in multiple layers.

Meanwhile, the electrode assembly 10 may include a welding target region that is a region in which the number of overlapping layers of the segment pieces F of the first uncoated portion 11 and/or the second uncoated portion 12 remains constant along a radial direction of the electrode assembly 10. In this welding target region, since the number of overlapping layers of the segment pieces F is maintained approximately at a maximum, it may be advantageous that welding of the first current collector 50 and the first uncoated portion 11 and/or welding of the second current collector 80 and the second uncoated portion 12 are performed in the welding target region. This is, for example, to prevent the laser beam penetrating the first uncoated portion 11 and/or the second uncoated portion 12 from damaging to the electrode assembly 10 when the power of the laser is increased to improve welding quality in the case of applying laser welding. Also, this is to effectively prevent foreign substances, such as welding spatter, from being introduced into the electrode assembly 10.

Referring to FIGS. 1 to 3C, the battery housing 20 is a substantially cylindrical container having an opening formed at its lower portion, and is made of a conductive metal material. The side and upper surfaces of the battery housing 20 may be integrally formed. The upper surface of the battery housing 20, that is, the outer surface of the partially closed portion of the battery housing 20 has a substantially flat shape. The battery housing 20 accommodates the electrode assembly 10 through an opening formed on one side of the battery housing 20 in the height direction (direction parallel to the Z-axis), and also accommodates an electrolyte.

The battery housing 20 may have an open lower end in the height direction (direction parallel to the Z-axis) and a closed upper end. The battery housing 20 may include a beading portion 21 and a crimping portion 22 formed at a lower end thereof. The beading portion 21 is formed under the electrode assembly 10. The beading portion 21 may be formed by pressing in the outer circumference of the battery housing 20. For example, the beading portion 21 may function as a support portion on which the cap 30 is seated by preventing the electrode assembly 10 having a size corresponding to the width (diameter) of the battery housing 20 from coming out through the opening formed at the bottom of the battery housing 20. In another aspect, the beading portion 21 may also function as a support portion on which the first current collector 50 is seated. That is, the edge of the first current collector 50 may be supported by the beading portion 21.

The crimping portion 22 is formed under the beading portion 21. The crimping portion 22 may have a shape extending and bent so that an end defining an opening of the battery housing 20 under the beading portion 21 surrounds the edge of the cap 30.

However, the battery housing 20 of the present disclosure may not include the beading portion 21 and/or the crimping portion 22. In this case, fixing of the electrode assembly 10 and/or fixing of the cap 30 and/or sealing of the battery housing 20 may be realized, for example, by additional application of components that may function as a stopper for the electrode assembly 10 and/or by additional application of a structure on which the cap 30 may be seated and/or by welding between the battery housing 20 and the cap 30.

Meanwhile, the battery housing 20 has the same polarity as that of the first uncoated portion 11 extending downward. The battery housing 20 is electrically connected to the first uncoated portion 11 through the cap 30. The polarity of the battery housing 20 will be described later in more detail along with the description of the cap 30.

Referring to FIGS. 2 to 5, the cap 30 covers an opening formed at the bottom of the battery housing 20, and is electrically connected to the battery housing 20 and the first uncoated portion 11. The cap 30 is a component that made of a conductive metal material. The cap 30 includes a venting portion 31 that is broken due to an increase in internal pressure to discharge internal gas, and a connection portion P for electrical connection with the first uncoated portion 11. In the cylindrical battery 1 of the present disclosure, the cap 30 functions as a venting member when an internal pressure increases due to abnormal occurrence of the battery, and also functions as a current blocking member when an overcurrent occurs.

The cap 30 may be coupled to an opening formed at the bottom of the battery housing 20 by welding. Alternatively, the cap 30 may be fixed in the crimping portion 22 of the battery housing 20 by a sealing gasket 60 to be described later. Of course, even when the sealing gasket 60 is applied, fixing by welding may be performed in parallel for better fixing force and reduction of electric resistance.

The cap 30 is electrically connected to the first uncoated portion 11 of the electrode assembly 10. The first uncoated portion 11 of the electrode assembly 10 may be directly coupled to the connection portion P of the cap 30. Alternatively, the first uncoated portion 11 of the electrode assembly 10 may be coupled to the connection portion P of the cap 30 through a first current collector 50 and/or a lead tab L, which will be described later.

The venting portion 31 corresponds to a weaker region in terms of rigidity compared to the peripheral region of the cap 30. When the venting portion 31 is created by adjusting the thickness of the cap 30, the venting portion 31 corresponds to a region of the cap 30 having a thinner thickness compared to the peripheral region of the cap 30. For example, the venting portion 31 may have a groove shape formed on the outer surface and/or the inner surface of the cap 30. If the cap 30 is made of the same material as a whole and the thickness of a specific region is thinner, and when the internal pressure of the battery housing 20 increases abnormally and significantly, a region formed to have a thinner thickness is broken, and the gas generated therein may be discharged through the broken portion. Of course, alternatively, it is also possible to form the venting portion 31 by applying a weaker material in terms of strength and/or melting point compared to the peripheral region.

The cylindrical battery 1 according to an embodiment of the present disclosure has a structure in which a battery terminal 40 is provided at the upper portion in the height direction (direction parallel to the Z-axis) to be described later, and thus the upper structure is more complicated than the lower structure. Therefore, the venting portion 31 may be formed in the cap 30 constituting the bottom surface of the cylindrical battery 1 in order to discharge the internal gas through the venting.

Figure 5:
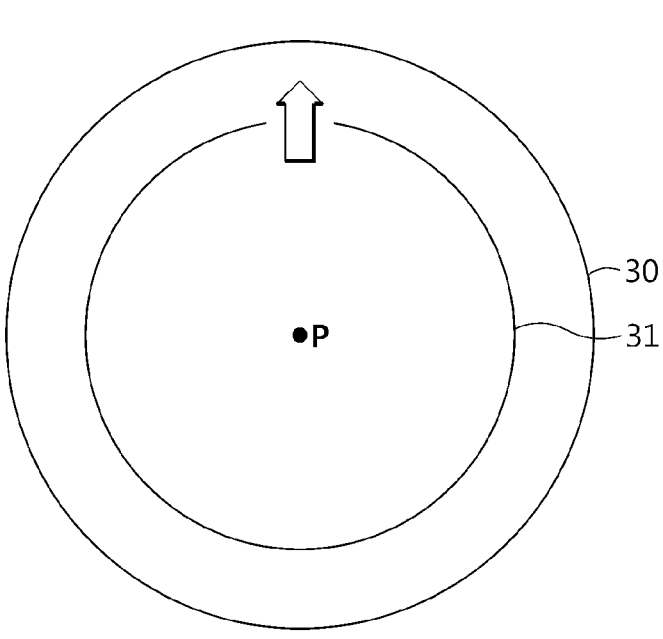
FIG. 5 is a conceptual view for describing a positional relationship of a connection portion and a venting portion provided on a cap of the present disclosure, and a shape of a venting portion.

Meanwhile, the venting portion 31 is continuously formed while drawing a closed loop, and the connection portion P is located in the closed loop. That is, the current moving from the first uncoated portion 11 of the electrode assembly 10 through the cap 30 to the battery housing 20 should pass through the venting portion 31. This is to allow the cap 30 to function not only as a venting member as described above but also as a current blocking member when an overcurrent occurs. When the connection portion P is located outside the closed loop of the venting portion 31, the current will not pass through the venting portion 31, and thus the venting portion 31 may not function as a current blocking member. In addition, even if the connection portion P is located in the loop formed by the venting portion 31, and if the loop does not form a closed loop as shown in FIG. 5 but has a portion thereof open, the current transmitted from the electrode assembly 10 to the cap 30 will flow through the open region (indicated by the arrow), and thus the venting portion 31 may not function as a current blocking member.

Figure 2:
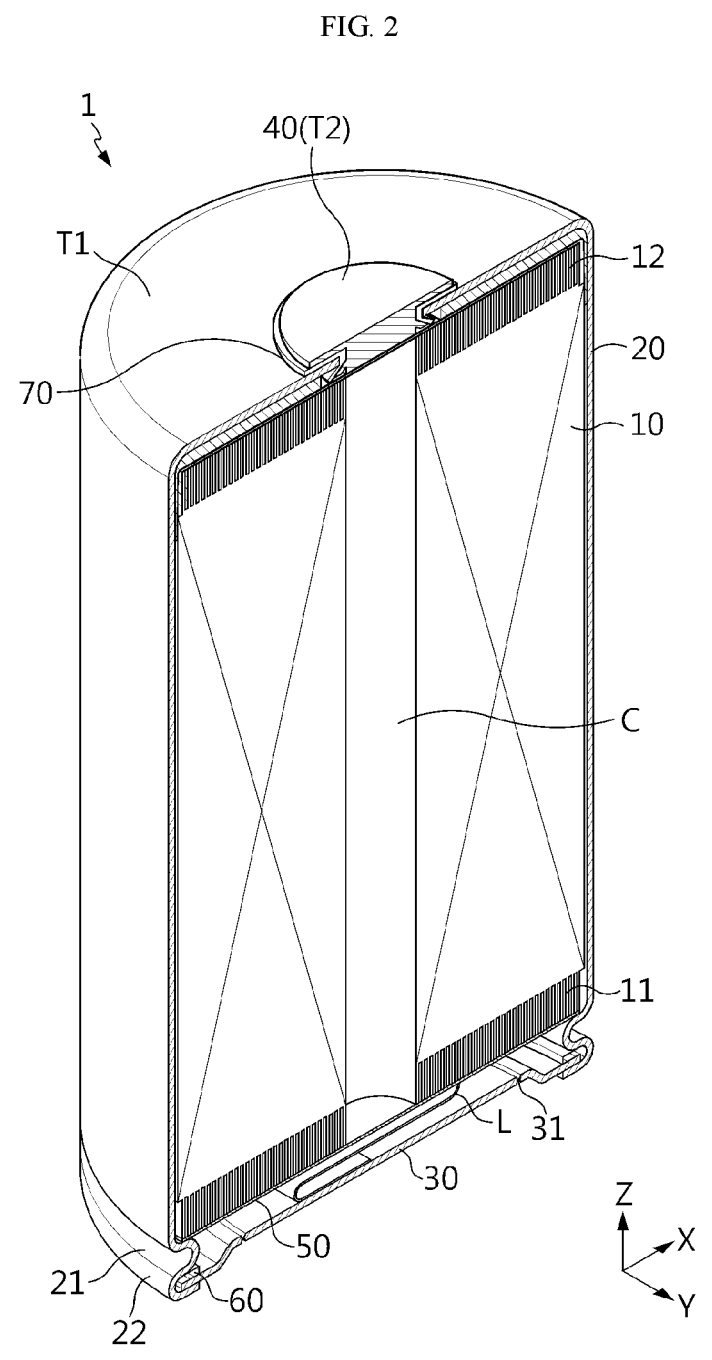
Figure 6:
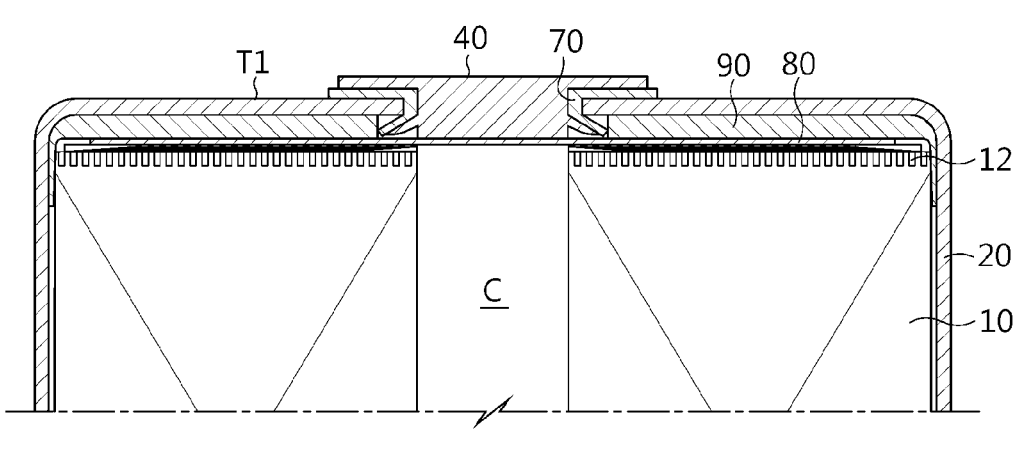
FIG. 6 is a partial cross-sectional view illustrating an upper structure of a cylindrical battery according to an embodiment of the present disclosure.

Referring to FIGS. 1, 2, and 6, the battery terminal 40 may penetrate the partially closed portion located on the opposite side of the opening formed on one side of the battery housing 20. The battery terminal 40 is electrically connected to the second uncoated portion 12 of the electrode assembly 10 in the battery housing 20. The battery terminal 40 may be directly coupled to the second uncoated portion 12, or may be electrically connected to the electrode assembly 10 through a second current collector 80 to be described later. The battery terminal 40 is a component made of a conductive metal material. The battery terminal 40 is electrically insulated from the battery housing 20.

Insulation between the battery terminal 40 and the battery housing 20 may be realized in various ways. For example, insulation may be realized by applying an insulating gasket 70. As another example, insulation may be realized by coating at least a portion of the battery terminal 40 and/or the battery housing 20 for insulation. As still another example, insulation may be realized by firmly fixing the battery terminal 40 so that the state of separation between the battery terminal 40 and the battery housing 20 is maintained without treatment such as coating for insulation or application of a separate component.

The battery terminal 40 may penetrate a substantially central portion of the upper surface (surface parallel to the X-Y plane) of the battery housing 20. At least a portion of the battery terminal 40 partially inserted into the battery housing 20 may be coupled to the second uncoated portion 12 of the electrode assembly 10 or the second electrode current collector 80 by welding or the like. Also, at least a portion of the battery terminal 40 partially inserted into the battery housing 20 may be bent toward the upper surface of the battery housing 20 to be riveted. That is, the battery terminal 40 of the present disclosure may be a rivet-type terminal that penetrates the battery housing 20 and is coupled to the inner surface of the battery housing 20 by riveting.

As described above, in the cylindrical battery 1 of the present disclosure, the upper surface of the battery housing 20 having the same polarity as the first uncoated portion 11, that is, the outer surface of the partially closed portion may function as the first electrode terminal T1, and the battery terminal 40 having the same polarity as the second uncoated portion 12 may function as the second electrode terminal T2. Therefore, the cylindrical battery 1 of the present disclosure has a structure in which a pair of electrode terminals T1, T2 are both provided at one side in the height direction, and thus all electrical connection components may be concentrated in one direction when the plurality of cylindrical batteries 1 are electrically connected. This structure may lead to structural simplification in the manufacture of the battery pack, thereby improving productivity and energy density.

In addition, the cylindrical battery 1 of the present disclosure may use the entire remaining region excluding the region occupied by the battery terminal 40 among the substantially flat upper surface of the battery housing 20 as the first electrode terminal T1. Therefore, it is possible to ensure a sufficient coupling area when a component for electrical connection such as a busbar is coupled to the first electrode terminal T1. Accordingly, even when a large-area busbar is applied, easy coupling is possible, and electric resistance at a coupling portion may be reduced.

Figure 3A:
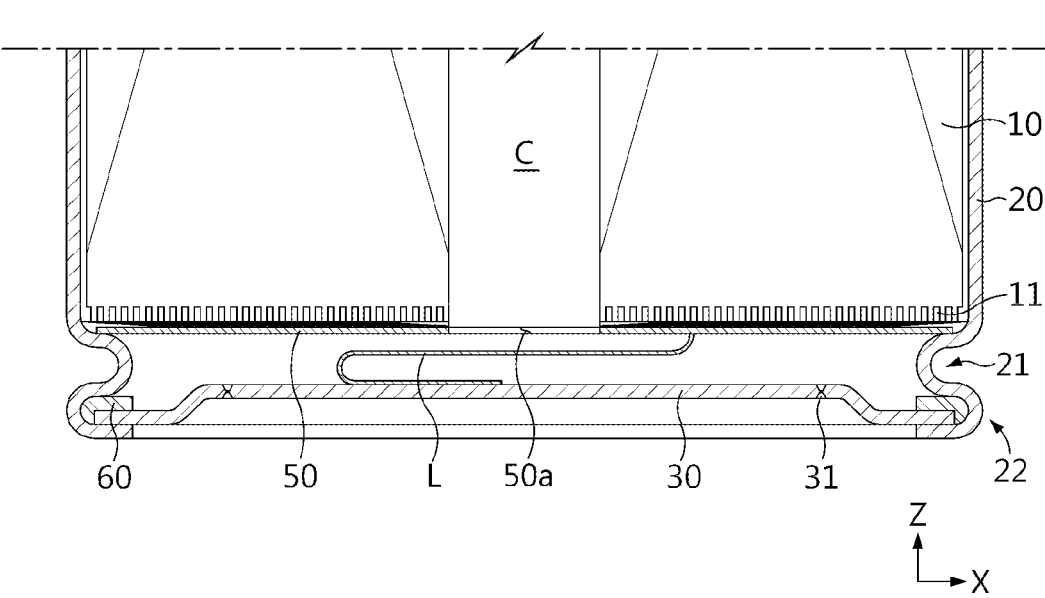
FIG. 3A is a cross-sectional view illustrating a lower structure of a battery, and is a view for describing a problem that may occur when a first current collector comes into contact with a battery housing in the battery of the present disclosure.
Figure 3B:
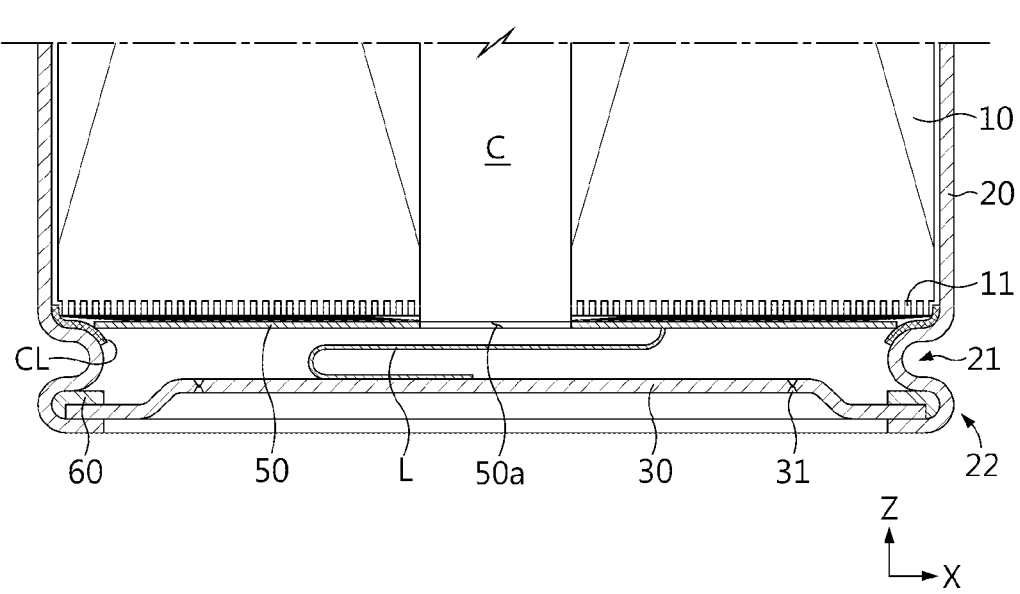
FIGS. 3B and 3C are partial cross-sectional views illustrating a lower structure of a cylindrical battery according to an embodiment of the present disclosure.
Figure 3C:
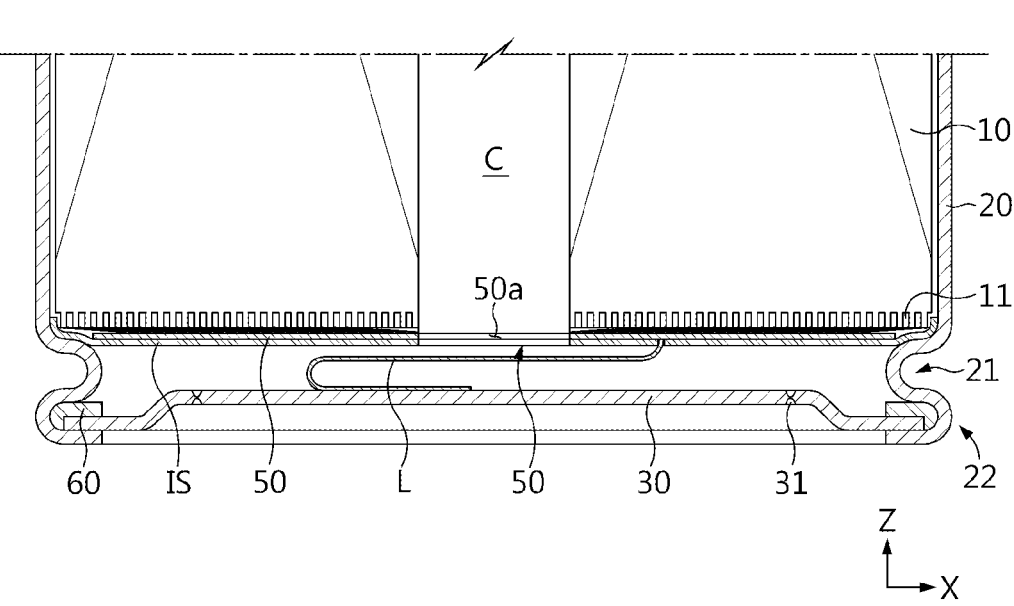
Figure 4:
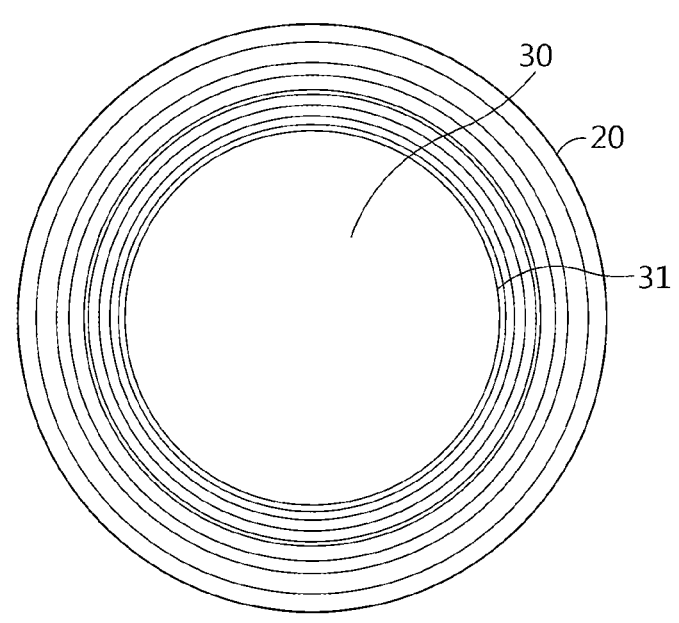
FIG. 4 is a view illustrating a bottom surface of a cylindrical battery according to an embodiment of the present disclosure.

Referring to FIGS. 2 to 3C, the first current collector 50 may be coupled to the lower end of the electrode assembly 10 in the height direction (direction parallel to the Z-axis). The first current collector 50 may be coupled to the first uncoated portion 11. The first current collector 50 is electrically connected to the cap 30. That is, when the cylindrical battery 1 includes the first current collector 50, the first uncoated portion 11 of the electrode assembly 10 is electrically connected to the cap 30 through the first current collector 50. The first current collector 50 may be electrically connected to the cap 30 through, for example, a lead tab L. The lead tab L may be a component integrally formed with the first current collector 50, or may be provided separately so that one side thereof is coupled to the first current collector 50 and the other side is coupled to the cap 30. Referring to FIG. 5 along with FIGS. 2 and 3, the first current collector 50 or the lead tab L is coupled to the connection portion P of the cap 30, and the connection portion P is located in the closed loop formed by the venting portion 31. This is to ensure that the current passing between the first current collector 50 and the battery housing 20 should pass through the venting portion 31, thereby quickly blocking the overcurrent by the venting portion 31 when an overcurrent occurs.

Preferably, the lead tab L may be configured to have a length longer than the distance between the first current collector 50 and the cap 30. This is to prevent the breaking pressure of the venting portion 31 from being greater than a design value due to the lead tab L when the extension length of the lead tab L is insufficient.

Meanwhile, the first current collector 50 may include a current collector hole 50a formed at a position corresponding to the hole formed in the winding center C of the electrode assembly 10. The current collector hole 50a communicates with a hole formed in the winding center C of the electrode assembly 10, and thus a tool is inserted or a laser beam is passed through the winding center hole of the electrode assembly 10, thereby welding the second current collector 80 positioned opposite to the first current collector 50 and the battery terminal 40. The current collector hole 50a may also function as a passage for injecting an electrolyte.

Referring to FIGS. 2 to 3C, the sealing gasket 60 is a component applied to improve sealing properties by the cap 30 covering the opening at the bottom of the battery housing 20 in the height direction (direction parallel to the Z-axis). In consideration of this function, a material having elasticity may be applied as a material of the sealing gasket 60. The sealing gasket 60 is partially interposed between the battery housing 20 and the cap 30. As described above, the battery housing 20 should be in contact with the cap 30 to be electrically connected. Therefore, the sealing gasket 60 should not completely block the contact between the battery housing 20 and the cap 30. To this end, the sealing gasket 60 is interposed between the cap 30 and the battery housing 20 in a region where the crimping portion 22 of the battery housing 20 is formed, and may be interposed in the remaining region excluding a contact region between the cap 30 and the battery housing 20.

Referring to FIGS. 1, 2 and 6, the insulating gasket 70 may be interposed between the battery housing 20 and the battery terminal 40 to prevent the battery housing 20 and the battery terminal 40 having opposite polarities to each other from being in contact with each other. Also, the insulating gasket 70 may prevent the sealing properties of the battery housing 20 from being deteriorated due to the application of the battery terminal 40. In consideration of this function, a material having insulating properties and elasticity may be applied as the material of the insulating gasket 70. A portion of the insulating gasket 70 may be bent along with the flange portion of the battery terminal 40 toward the inner surface of the partially closed portion of the battery housing 20 during riveting of the battery terminal 40. Accordingly, a portion of the insulating gasket 70 may be interposed between the flange portion of the battery terminal 40 and the inner surface of the partially closed portion of the battery housing 20.

Referring to FIG. 6, the second current collector 80 is coupled to the upper end of the electrode assembly 10 in the height direction (direction parallel to the Z-axis). Accordingly, the second current collector 80 is coupled to the second uncoated portion 12. The second current collector 80 is electrically connected to the battery terminal 40. That is, when the cylindrical battery 1 includes the second current collector 80, the second uncoated portion 12 of the electrode assembly 10 is electrically connected to the battery terminal 40 through the second current collector 80. The second current collector 80 may be directly coupled to the battery terminal 40. Alternatively, the second current collector 80 may be electrically connected to the battery terminal 40 through a separate component such as a lead tab (not shown) as similar to the first current collector 50 (see FIG. 3A) described above. In this case, the lead tab may be a component integrally formed with the second current collector 80, or may be provided separately from the second current collector 80 so that one side thereof is coupled to the second current collector 80 and the other side may be coupled to the battery terminal 40.

Figure 8:
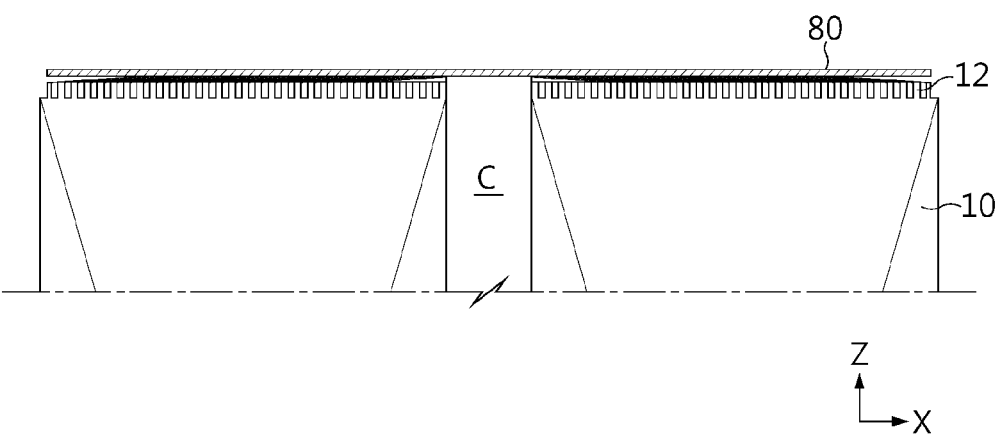
FIGS. 8 and 9 are views illustrating a coupling structure between a current collector and an uncoated portion of an electrode assembly applied to the present disclosure.
Figure 9:
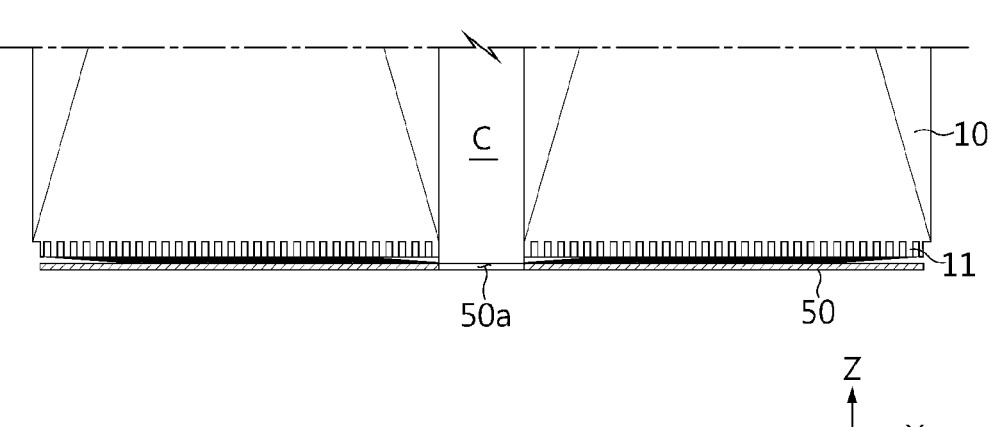

Meanwhile, referring to FIGS. 8 and 9, a coupling structure between the current collectors 50, 80 and the electrode assembly 10 applied to the present disclosure is illustrated.

First, referring to FIG. 8, the second current collector 80 may be coupled to a coupling surface formed by bending an end of the second uncoated portion 12 in a direction substantially parallel to the second current collector 80. The coupling between the second uncoated portion 12 and the second electrode current collector 80 may be performed, for example, by laser welding. The laser welding may be performed by partially melting the base material of the second current collector 80, or in a state where solder for welding is interposed between the second current collector 80 and the second uncoated portion 12. In this case, it is preferable that the solder has a lower melting point compared to the second current collector 80 and the second uncoated portion 12.

Referring to FIG. 9, the first current collector 50 may be coupled to a coupling surface formed by bending an end of the first uncoated portion 11 in a direction parallel to the first current collector 50. The bending direction of the first uncoated portion 11 may be, for example, a direction toward the winding center C of the electrode assembly 10.

When the first uncoated portion 11 and/or the second uncoated portion 12 have such a bent shape, a space occupied by the first uncoated portion 11 and/or the second uncoated portion 12 along the height direction (direction parallel to the Z-axis) of the electrode assembly 10 is reduced, that is, the height (length of the Z-axis direction) of the electrode assembly 10 is reduced, thereby improving energy density.

Referring to FIG. 6, the insulator 90 is interposed between the upper end of the electrode assembly 10 and the inner surface of the battery housing 20 or between the second current collector 80 coupled to the upper portion of the electrode assembly 10 and the inner surface of the battery housing 20. The insulator 90 may have a shape extending to additionally cover the side of the electrode assembly 10. The insulator 90 prevents contact between the second uncoated portion 12 and the battery housing 20 or between the second current collector 80 and the battery housing 20.

When the cylindrical battery 1 of the present disclosure includes the insulator 90 disposed on top of the electrode assembly 10, the battery terminal 40 penetrates the insulator 90 inside the battery housing 20 to be coupled to the second current collector 80 or the second uncoated portion 12.

Meanwhile, when the first current collector 50 and the battery housing 20 are directly in contact with each other as shown in FIG. 3A of the present disclosure, the cap 30 of the present disclosure may not function as an overcurrent blocking member. In order for the cap 30 to function as an overcurrent blocking member, an electrical connection between the first current collector 50 and the battery housing 20 should be made through the cap 30. This is because the current transmitted from the first current collector 50 should pass through the venting portion 31 formed in the cap 30, whereby the venting portion 31 configured to have a thickness thinner than the periphery is broken by the overcurrent to block an overcurrent.

Referring to FIGS. 3B and 3C, an insulating layer CL and/or an insulator (second insulator) IS may be interposed between the first current collector 50 and the battery housing 20 in order to prevent the first current collector 50 from directly contacting the battery housing 20.

The insulating layer CL may be interposed between the edge of the first current collector 50 and the beading portion 21 of the battery housing 20 facing each other. The insulating layer CL may be, for example, an insulating coating layer formed on the surface of any one of the first current collector 50 and/or the beading portion 21.

The insulator (second insulator) IS may cover a lower surface of the electrode assembly 10 facing the cap 30. The insulator IS may have a shape extending to be interposed between the first uncoated portion 11 and the inner surface of the sidewall portion of the battery housing 20, both of which face each other, for the sake of ensuring insulation. The insulator IS may include a hole formed at a position corresponding to the hole formed in the winding center C of the electrode assembly 10. This hole may function as a passage for injecting an electrolyte and/or a passage for inserting a tool or passing a laser beam for welding the second current collector 80 and the battery terminal 40. Meanwhile, the insulator IS may include a hole through which the lead tab L electrically connecting the first current collector 50 and the cap 30 passes.

The above-described cylindrical battery 1 of the present disclosure has a structure in which resistance is minimized by expanding a welding area due to the formation of a coupling surface formed by bending the uncoated portions 11, 12, by expanding a welding area due to the coupling of busbars by using the outer surface of the partially closed portion of the battery housing 20, and the like. The AC resistance of the cylindrical battery 1 measured with a resistance meter between the positive electrode and negative electrode, between the battery terminals 40, T2 and the substantially flat surface T1 therearound may be approximately 0.5-4 milliohm suitable for fast charging, preferably approximately 1-4 milliohm.

Preferably, the cylindrical battery may be, for example, a cylindrical battery in which the ratio of the form factor (a value obtained by dividing a diameter of the cylindrical battery by a height, that is, the ratio of the diameter D to the height H) is greater than approximately 0.4.

Here, the form factor refers to a value indicating the diameter and height of the cylindrical battery. Preferably, the diameter of the cylindrical battery may be approximately 40-50 mm, and the height may be approximately 60-130 mm. The cylindrical battery according to an embodiment of the present disclosure may be, for example, a 46110 battery, a 4875 battery, a 48110 battery, a 4880 battery, and a 4680 battery. In the figure representing the form factor, the first two numbers represent the diameter of the battery, and the remaining numbers represent the height of the battery.

When an electrode assembly having a tab-less structure is applied to a cylindrical battery having a form factor ratio of more than 0.4, the uncoated portion is easily torn due to a large stress applied in the radial direction when the uncoated portion is bent. Also, when welding the current collector to the bent surface region of the uncoated portion, it is necessary to sufficiently increase the number of stacks of the uncoated portion in the bent surface region in order to sufficiently ensure welding strength and lower resistance. This requirement may be achieved by the electrode and the electrode assembly according to embodiments (modified examples) of the present disclosure.

The battery according to an embodiment of the present disclosure is a substantially cylindrical battery, and may have a diameter of approximately 46 mm, a height of approximately 110 mm, and a form factor ratio of approximately 0.418.

The battery according to another embodiment is a substantially cylindrical battery, and may have a diameter of approximately 48 mm, a height of approximately 75 mm, and a form factor ratio of approximately 0.640.

The battery according to still another embodiment is a substantially cylindrical battery, and may have a diameter of approximately 48 mm, a height of approximately 110 mm, and a form factor ratio of approximately 0.418.

The battery according to still another embodiment is a substantially cylindrical battery, and may have a diameter of approximately 48 mm, a height of approximately 80 mm, and a form factor ratio of approximately 0.600.

The battery according to still another embodiment is a substantially cylindrical battery, and may have a diameter of approximately 46 mm, a height of approximately 80 mm, and a form factor ratio of approximately 0.575.

Conventionally, batteries having a form factor ratio of approximately 0.4 or less have been used. That is, conventionally, for example, an 1865 battery, a 2170 battery, and the like have been used. In the case of the 1865 battery, its diameter is approximately 18 mm, its height is approximately 65 mm, and the form factor ratio is approximately 0.277. In the case of the 2170 battery, its diameter is approximately 21 mm, its height is approximately 70 mm, and the form factor ratio is approximately 0.300.

Figure 10:
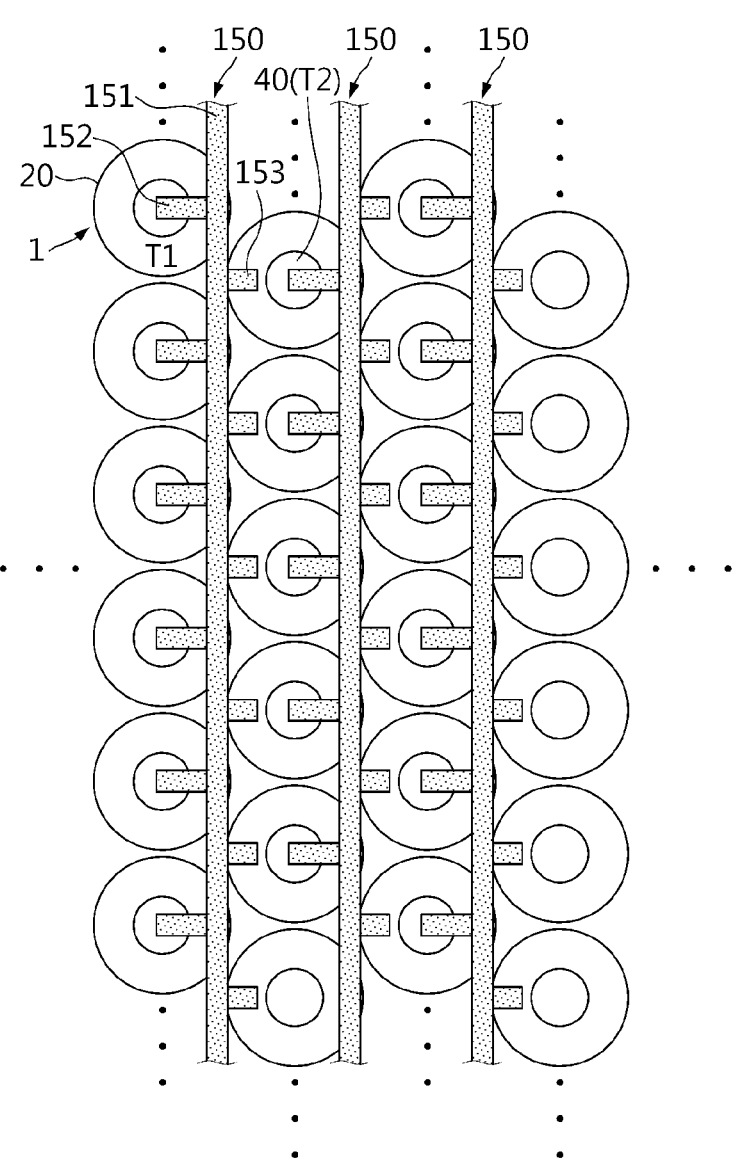
FIG. 10 is a top plan view illustrating a state in which a plurality of cylindrical batteries according to an embodiment of the present disclosure are connected in series and in parallel using busbars.

Referring to FIG. 10, a plurality of cylindrical batteries 1 may be connected in series and in parallel at the top of the cylindrical battery 1 using busbars 150. The number of cylindrical batteries 1 may be increased or decreased in consideration of the capacity of the battery pack.

In each cylindrical battery 1, the battery terminals 40, T2 may have a positive polarity, and the outer surface T1 of the partially closed portion of the battery housing 20 may have a negative polarity. Of course, the reverse is also possible.

Preferably, the plurality of cylindrical batteries 1 may be disposed in a plurality of columns and rows. Columns are in the vertical direction based on the ground, and rows are in the horizontal direction based on the ground. Also, in order to maximize space efficiency, the cylindrical batteries 1 may be disposed in a closest packing structure. The closest packing structure is formed when an equilateral triangle is formed in case the centers of the battery terminals 40 exposed to the outside of the battery housing 20 are connected to each other. Preferably, the busbars 150 may be disposed at the top of the plurality of cylindrical batteries 1, more preferably between adjacent columns. Alternatively, the busbars 150 may be disposed between adjacent rows.

Preferably, the busbar 150 connects the batteries 1 disposed in the same column in parallel with each other and the cylindrical batteries 1 disposed in two adjacent columns in series with each other.

Preferably, the busbar 150 may include a body portion 151, a plurality of first busbar terminals 152, and a plurality of second busbar terminals 153 for serial and parallel connections.

The body portion 151 may extend between the battery terminals 40 of adjacent cylindrical batteries 1, preferably between columns of the cylindrical batteries 1. Alternatively, the body portion 151 may extend along the columns of the cylindrical batteries 1 and may be regularly bent like a zigzag shape.

The plurality of first busbar terminals 152 may protrude and extend from one side of the body portion 151 toward the battery terminal 40 of each cylindrical battery 1, and may be electrically coupled to the battery terminal 40. The electrical coupling between the first busbar terminal 152 and the battery terminal 40 may be performed by laser welding, ultrasonic welding, or the like. In addition, the plurality of second busbar terminals 153 may be electrically coupled to the outer surface T1 of the partially closed portion of the battery housing 20 of each cylindrical battery 1 from the other side of the body portion 151. The electrical coupling between the second busbar terminal 153 and the outer surface T1 may be performed by laser welding, ultrasonic welding, or the like.

Preferably, the body portion 151, the plurality of first busbar terminals 152, and the plurality of second busbar terminals 153 may be formed of one conductive metal plate. The metal plate may be, for example, an aluminum plate or a copper plate, but the present disclosure is not limited thereto. In a modified example, the body portion 151, the plurality of first busbar terminals 152, and the plurality of second busbar terminals 153 may be manufactured in separate pieces and then coupled to each other by welding or the like.

In the cylindrical battery 1 according to the present disclosure, since the battery terminal 40 having a positive polarity and the outer surface T1 of the partially closed portion of the housing 20 having a negative polarity are located in the same direction, it is possible to easily implement the electrical connection of the cylindrical batteries 1 by using the busbar 150.

In addition, since the battery terminal 40 of the cylindrical battery 1 and the outer surface T1 of the partially closed portion of the battery housing 20 have a large area, it is possible to sufficiently ensure the coupling area of the busbar 150 and to sufficiently lower resistance of the battery pack including the cylindrical battery 1.

Figure 11:
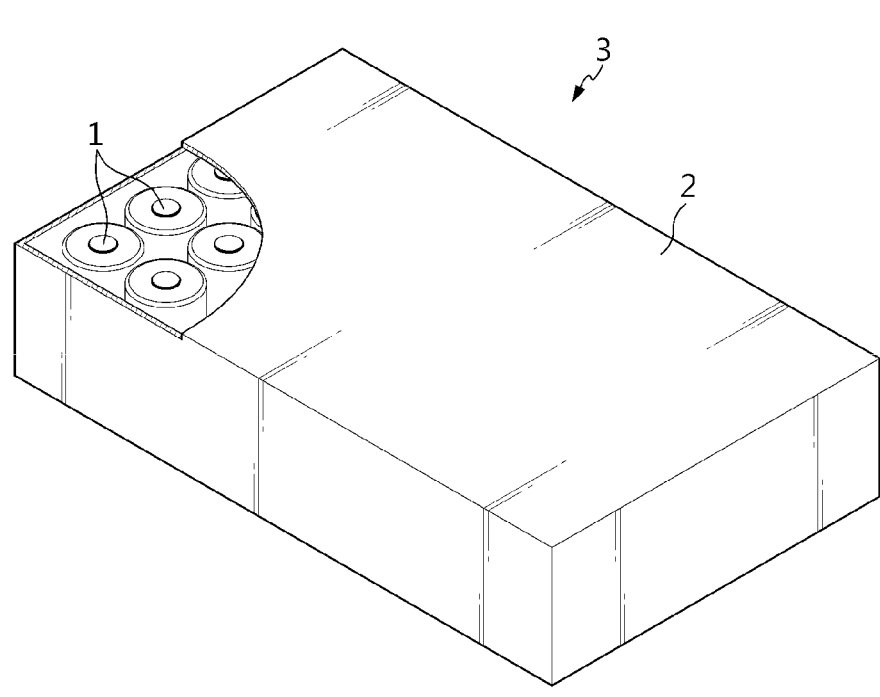
FIG. 11 is a schematic view illustrating a battery pack according to an embodiment of the present disclosure.

Meanwhile, referring to FIG. 11, a battery pack 3 according to an embodiment of the present disclosure includes a battery assembly in which a plurality of cylindrical batteries 1 according to an embodiment of the present disclosure as described above are electrically connected, and a pack housing 2 accommodating the same. The electrical connection structure of the plurality of batteries 1 through the busbar has been exemplarily described above with reference to FIG. 10, and other components such as a cooling unit, a power terminal, and the like are omitted for convenience of illustration.

Figure 12:
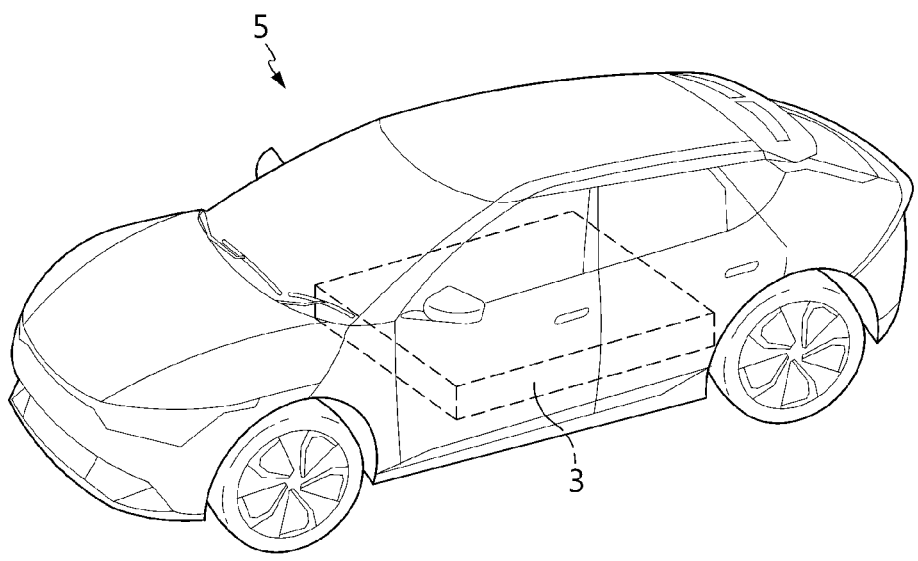
FIG. 12 is a conceptual view illustrating a vehicle according to an embodiment of the present disclosure.

Referring to FIG. 12, a vehicle 5 according to an embodiment of the present disclosure may be, for example, an electric vehicle, and includes the battery pack 3 according to an embodiment of the present disclosure. The vehicle 5 is operated by receiving power from the battery pack 3 according to an embodiment of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

5: vehicle
3: battery pack
2: pack housing
1: battery
10: electrode assembly
C: winding center
11: first uncoated portion
12: second uncoated portion
F: segment pieces
20: battery housing
T1: first electrode terminal
21: beading portion
22: crimping portion
30: cap
31: venting portion
40: battery terminal
T2: second electrode terminal
50: first current collector
L: lead tab

16

60: sealing gasket
70: insulating gasket
80: second current collector
90: insulator (first insulator)
IS: insulator (second insulator)
CL: insulating layer

What is claimed is:

1. A battery comprising:
an electrode assembly comprising a first electrode, a second electrode, and a separator located between the first electrode and the second electrode, the first electrode, the second electrode, and the separator being wound in a winding direction to define a core at a winding center and an outer circumference of the electrode assembly, wherein the first electrode and the second electrode include a first uncoated portion and a second uncoated portion on which an active material layer is not coated along the winding direction, respectively;
a battery housing accommodating the electrode assembly therein, the battery housing having an opening at a first side of the battery housing;
a cap comprising a venting portion having a thinner thickness compared to a peripheral region of the cap, the cap covering the opening, and the cap being electrically connected to the battery housing and the first uncoated portion;
a battery terminal electrically connected to the second uncoated portion; and
a second current collector coupled to the second uncoated portion,
wherein the battery housing is electrically connected to the first uncoated portion through the cap,
wherein the battery terminal is exposed to the outside of the battery housing by extending through a closed portion of the battery housing located at the opposite side of the opening, and
wherein the second current collector is coupled to the battery terminal at a location corresponding to a winding center hole of the electrode assembly.

2. The battery according to claim 1, wherein the cap comprises a connection portion electrically connected to the first uncoated portion.

3. The battery according to claim 2, wherein the venting portion is a closed loop, and
wherein the connection portion is encircled by the closed loop.

4. The battery according to claim 1, wherein the venting portion is a groove on at least one of an outer surface of the cap and an inner surface of the cap.

5. The battery according to claim 1, wherein the battery terminal extends through a central portion of the closed portion.

6. The battery according to claim 1, wherein the battery terminal is electrically insulated from the battery housing.

7. The battery according to claim 1, further comprising a first current collector coupled to the first uncoated portion.

8. The battery according to claim 7, wherein the first current collector is electrically connected to the cap.

9. The battery according to claim 8, further comprising a lead tab electrically connecting the first current collector and the cap.

10. The battery according to claim 9, wherein the lead tab has a length longer than a distance between the first current collector and the cap.

11. The battery according to claim 7, wherein the battery housing comprises:

a beading portion adjacent the first side; and a crimping portion bent inward to provide an end defining the opening, the end of the crimping portion overlapping an edge of the cap below the beading portion, and wherein an edge of the first current collector is supported by the beading portion.

12. The battery according to claim 11, further comprising an insulating layer located between the edge of the first current collector and the beading portion of the battery housing.

13. The battery according to claim 12, wherein the insulating layer is an insulating coating layer located on a surface of any one of the first current collector or the beading portion.

14. The battery according to claim 11, further comprising an insulator covering a lower surface of the electrode assembly facing the cap.

15. The battery according to claim 14, wherein the insulator comprises a hole at a position corresponding to the core of the electrode assembly.

16. The battery according to claim 14, further comprising a lead tab electrically connecting the first current collector and the cap, and wherein the insulator comprises a hole through which the lead tab passes.

17. The battery according to claim 7, wherein at least a portion of the first uncoated portion comprises a plurality of segment pieces divided along the winding direction of the electrode assembly, and wherein the plurality of segment pieces are bent along a radial direction of the electrode assembly.

18. The battery according to claim 17, wherein the plurality of bent segment pieces are overlapped in multiple layers along the radial direction.

19. The battery according to claim 18, wherein the electrode assembly comprises a welding target region in which a number of overlapping segment pieces of the first uncoated portion remains constant along the radial direction of the electrode assembly, and wherein the first current collector is coupled to the first uncoated portion in the welding target region.

20. The battery according to claim 1, wherein the second current collector is electrically connected to the battery terminal.

21. The battery according to claim 1, further comprising a sealing gasket located between the cap and the battery housing.

22. The battery according to claim 21, wherein the battery housing comprises:

a beading portion adjacent the first side; and a crimping portion bent inward to provide an end defining the opening, the end of the crimping portion overlapping an edge of the cap below the beading portion.

23. The battery according to claim 22, wherein the sealing gasket is located between the crimping portion and the cap in a region other than a contact region between the cap and the battery housing.

24. The battery according to claim 1, wherein at least a portion of the second uncoated portion comprises a plurality of segment pieces divided along the winding direction of the electrode assembly, and wherein the plurality of segment pieces are bent along a radial direction of the electrode assembly.

25. The battery according to claim 24, wherein the plurality of bent segment pieces are overlapped in multiple layers along the radial direction.

26. The battery according to claim 25, wherein the electrode assembly comprises a welding target region in which a number of overlapping segment pieces of the second uncoated portion remains constant along the radial direction of the electrode assembly, and wherein the second current collector is coupled to the second uncoated portion in the welding target region.

27. The battery according to claim 1, wherein a resistance measured between the first electrode and the second electrode is 4 milliohm or less.

28. A battery pack comprising a plurality of batteries according to claim 1.

29. The battery pack according to claim 28, wherein the plurality of batteries are arranged in a predetermined number of columns, and wherein the battery terminal and an outer surface of the closed portion of the battery housing of each battery are disposed to face upward.

30. The battery pack according to claim 28, further comprising a plurality of busbars connecting the plurality of batteries in series and in parallel, wherein the plurality of busbars are disposed on top of the plurality of batteries, and wherein each of the busbars comprises:

a body portion extending between the battery terminals of adjacent batteries of the plurality of batteries;

a plurality of first busbar terminals extending from a first side of the body portion, the first bus bar terminals being electrically coupled to the battery terminals of the batteries arranged on the first side; and a plurality of second busbar terminals extending from a second side of the body portion opposite the first side, the plurality of second bus bars being electrically coupled to the outer surfaces of the closed portions of the battery housings of the batteries arranged on the second side.

31. A vehicle comprising a battery pack according to claim 28.

32. The battery according to claim 1, wherein an outer surface of the closed portion is flat.

* * * * *